INVENTOR.
HOWARD LESSOFF
BY
W.J. Hill
AGENT

United States Patent Office 3,009,880
Patented Nov. 21, 1961

3,009,880
METHOD FOR PREPARING NICKEL-ZINC FERRITES
Howard Lessoff, Milton, Mass., assignor to Radio Corporation of America, a corporation of Delaware
Filed Dec. 31, 1958, Ser. No. 784,162
3 Claims. (Cl. 252—62.5)

This invention relates to magnetic bodies and particularly, but not necessarily exclusively, to magnetic bodies of sintered ferrite crystallites having improved initial permeabilities and improved loss characteristics at high and low frequencies.

The term "ferrite" as used herein refers to a class of inorganic compounds having a spinel structure and the molar formula $M^{2+}(M^{3+})_2O_4$, where $M^{2+}$ may be one or more divalent cations and $M^{3+}$ may be one or more trivalent cations one of which is iron.

Magnetic bodies consisting essentially of sintered ferrite crystallites, also referred to as ferrite bodies, are useful in many electronic devices. For uses as cores in antennas, inductors, transformers, and other low loss applications, it is important that ferrite bodies exhibit a high initial permeability and a low loss characteristic. Further, since broad ranges of frequencies are used in such applications, it is desirable that the high initial permeability and low loss characteristic be exhibited at both high and low frequencies.

An object of this invention is to provide improved magnetic bodies of sintered ferrite crystallites and to improved methods of preparing said bodies.

A further object is to provide magnetic bodies having a high initial permeability and low loss characteristic.

The magnetic bodies of the invention consist essentially of sintered nickel-zinc ferrite crystallites having incorporated therein between 0.001 and 2.0 mol percent molybdenum, as a compound thereof. By incorporating molybdenum into the magnetic bodies herein, the initial permeabilities are increased and the magnetic losses are reduced.

The processes of the invention comprise the usual processes for preparing bodies of sintered ferrite crystallites except that between 0.001 and 2.0 mol percent molybdenum, as a compound thereof, is added and mixed with the batch of raw material prior to forming and sintering. A body is then formed from the batch, and the formed body is sintered in an oxygen atmosphere at temperatures between 950° C. and 1450° C.

Figure 1:
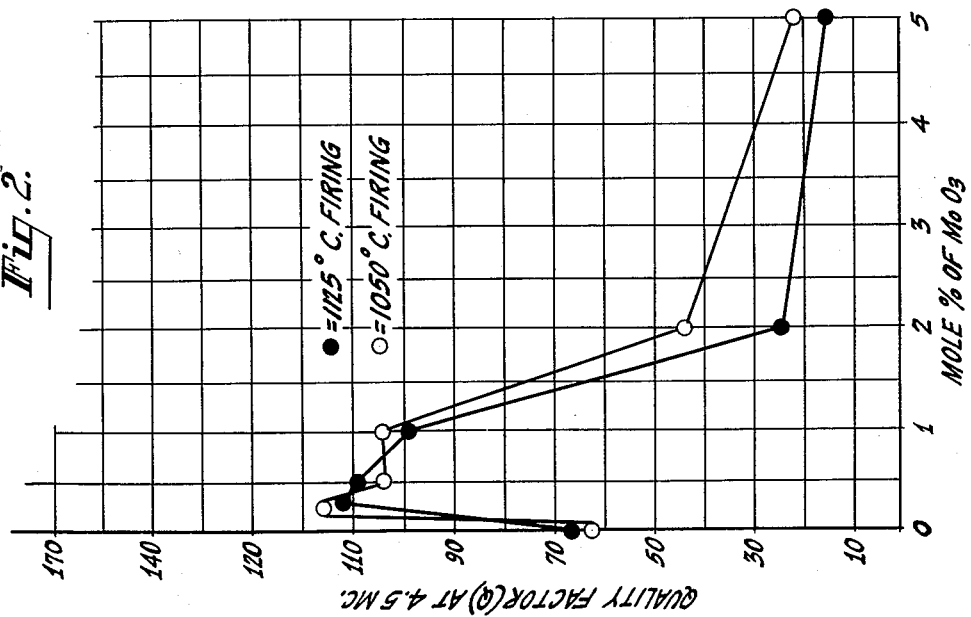
Figure 2:
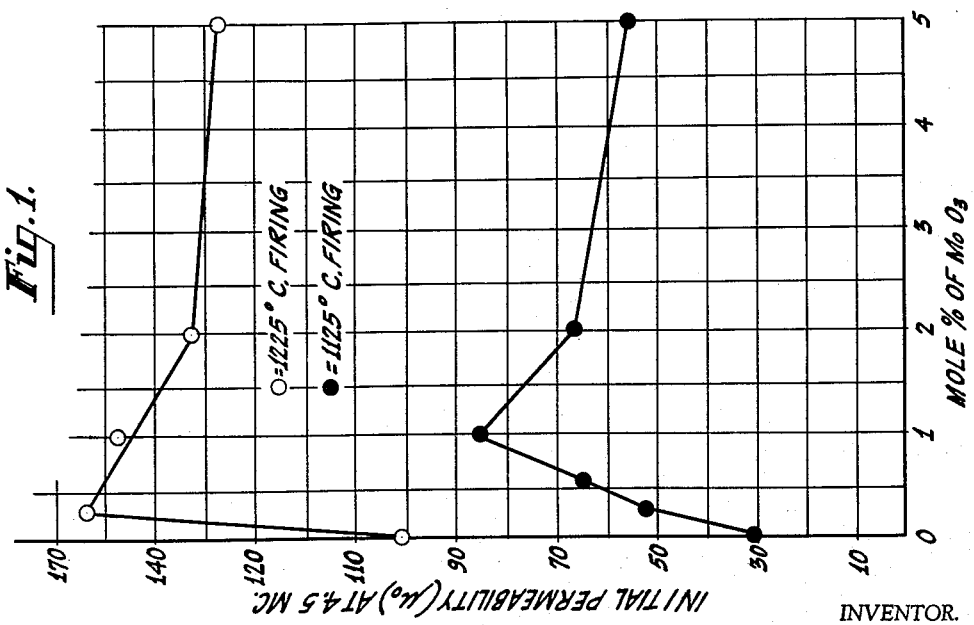

The novel features of the invention are set forth in greater detail in the following description in conjunction with the accompanying drawing in which:

FIGURES 1 and 2 are graphs showing the effect of additions of molybdenum trioxide on the initial permeability on the quality factor "Q" of ferrite bodies of the invention.

*Example 1.*—Pure, fine-particle oxides are rough mixed in the proportion as follows:

0.328 mol nickelous oxide, NiO
0.172 mol zinc oxide, ZnO
0.002 mol cobaltous oxide, CoO
0.500 mol ferric oxide, $Fe_2O_3$
0.005 mol molybdenum trioxide, $MoO_3$ Intimate mixing is accomplished by wet ball milling; i.e., tumbling a water slurry of the mixture of oxides with porcelain balls in a closed porcelain jar for about one hour. The mixed slurry is dried at about 200° C., and the dry mixture is ground and sieved to a fine powder.

An organic binder and lubricant is now added to aid in the forming step which follows. For each 100 grams of mixture, 1 gram of a low molecular weight solid polyethylene glycol, such as Carbowax 1000, Union Carbide and Chemical Corp., New York, N.Y., and 4 grams "Trigamine" stearate emulsified in hot water is added. These constituents are mixed together using additional water if necessary to obtain a uniform distribution of the added material. The water is evaporated by heating at about 75° C. and the dry material is sieved to the desired aggregate size.

Portions of the sieved material are pressed at about 10 tons per square inch in a polished steel mold (die size 0.228 inch O.D. x 0.118 inch I.D.) to form bodies of a toroidal shape which will have a size after sintering of about .200 inch O.D. x .100 inch I.D. x .045 inch thick.

The formed bodies are placed on a sillimanite setter plate and sintered to maturity, preferably in an electric furnace. The organic binder and lubricant are volatilized by heating the pressed body from room temperature to 300° C. in air and holding at that temperature for about two hours. Complete reaction, crystallization, and sintering is accomplished by increasing the temperature in about five hours to 1200° C. and holding at this temperature for about one hour. The heating at 1200° C. is carried on in an oxygen atmosphere. During the heating, the materials of the batch react to produce ferrite crystallites and the crystallites are sintered to a coherent body. The furnace is then shut off and the bodies allowed to cool to room temperature in the furnace in oxygen in about 16 hours.

The magnetic properties of the ferrite bodies prepared according to the example and ferrite bodies of the same composition prepared by a similar method but without molybdenum oxide are compared to Table I, demonstrating the improvement in the permeability and loss characteristic of bodies prepared by the methods of the invention. All ferrite bodies reported herein were measured on a Boonton "Q" meter 190A at the frequencies indicated.

*Table I*

| Frequency | 600 kc. | | 3.7 mc. | | 25 mc. | | 50 mc. | |
|---|---|---|---|---|---|---|---|---|
| | $\mu$ | Q | $\mu$ | Q | $\mu$ | Q | $\mu$ | Q |
| Ni-Zn ferrite | 63.5 | 140 | 61.5 | 64.6 | | | | |
| Ni-Zn ferrite+ $MoO_3$ | 118 | 230 | 122.0 | 88.0 | 130 | 21 | | |
| Ni-Zn ferrite+ $Co_2O_3$ and $MoO_3$ | 67 | 220 | 67 | 188 | 69 | 124 | 69 | 20 |
| Ni-Zn ferrite+ $Co_2O_3$ | 47 | 134 | 47 | 129 | 43 | 126 | 48 | 23 |

Additions, to the batch of raw materials, of minor amounts of barium, cobalt and vanadium as compounds thereof, have been found to further modify the initial permeability and losses. Such additions may be made in proportions up to 2 mol percent. Table I illustrates the improvement in initial permeability at 25 mc. and 50 mc. resulting from the further addition of 0.5 mol percent cobalt as cobalt oxide, $Co_2O_3$.

Molybdenum is added to any ferrite composition to improve the initial permeability and loss characteristic of a body thereof. The proportion used may be between 0.001 and 2.00 mol percent, preferably between 0.15 and 2.00 mol percent. The moybdenum is introduced as a compound thereof, preferably as an oxide such as molybdenum trioxide, $MoO_3$. Other suitable molybdenum compounds are molybdenum chlorides, bromides, oxychlorides, oxybromides, hydroxides and sulfides. See Handbook of Chemistry and Physics, 34th edition, Chemical Rubber Publishing Co., Cleveland, Ohio, page 532. FIGURE 1 and FIGURE 2 show the effect of additions of molybdenum compounds to the example of Ni-Zn ferrite with no cobalt additive. The initial permeability $\mu_0$ is increased in a range of $MoO_3$ additions up to 5.0 mol percent. The quality factor Q is increased in a range of $MoO_3$ extending above 1.0 mol percent. The product of $\mu Q$ is increased over a range of $MoO_3$ additions in a range of $MoO_3$ extending above 2.0 mol percent.

The other materials of the batch may be oxides (as in the example) or may be materials which decompose upon heating into oxides or other ferrite-forming compounds. After the batch is mixed, it may be calcined at temperatures up to 900° C in air, if so desired.

The synthesis of ferrite bodies of other compositions may be similar to the procedure of the example. Some process variations and their effects upon the characteristics of the sintered ferrite bodies are given below.

Mixing may be done alternatively by coprecipitating from solution the required proportion of oxides, or other ingredients which upon heating decompose into oxides. Mixtures obtained by this procedure are more intimately mixed, and so they react and crystallize at lower temperatures. The previously described process of mixing the solid ingredients, however, is preferred.

The calcining and grinding operations are optional and are used to aid intimate mixing and to help control the shrinkage and porosity of the product. It is essential to control shrinkage in order to obtain products of uniform size and shape. The porosity of the material may be varied by calcining at different particle sizes, or by adding inorganic 'fluxes" such as silicon dioxide, $SiO_2$. The control of porosity is required in order that the material will be in proper form for heat treatment. The importance of this control of porosity will be more fully discussed later.

Binders are added to make the powder particles cohere temporarily after they are pressed into different shapes and before sintering. Lubricants may also be added to facilitate molding. The binders and lubricants added are usually organic compounds, which can be volatilized by heating the formed bodies at low temperatures. Some materials which may serve as binders and lubricants are polyvinyl alcohol, diethylene glycol esters of rosin and methyl esters of rosin.

The pressures used for molding these materials are less critical than for the molding of powdered iron cores with organic binders. Pressures of about 5 to 10 tons per square inch have been found to be satisfactory. The material may also be extruded. For extrusions the content of the organic binder, lubricants, and water are usually higher, and the correct amount needed must be experimentally determined. In general, different shapes may be produced by processes similar to those used in the preparation of ceramics, such as extrusions, hydrostatic pressing and slip casting.

The final reaction, crystallization and sintering must be controlled carefully. In this procedure, the shaped body is heated to some temperature between 950° C. and 1450° C. in oxygen, air or nitrogen, depending upon the composition chosen and the properties desired. At these high temperatures, the cations and anions of the mixed oxides diffuse and react, and crystallites of a ferrite of spinel structure are produced. The formation of the ferrite is so rapid that when shaped bodies are heated from one to five minutes at about 1300° C. they show complete spinel X-ray diffraction patterns. Further heating influences chiefly the rate of growth of the crystals. Low temperatures and/or short periods of crystallization give small crystals, and high temperatures and/or long periods of crystallization give large crystals.

Because of the partial dissociation of the oxides at the crystallization temperatures, certain compositions require an increase in the positive charge of some or all of the cations for optimum ferromagnetic properties. A post-crystallization heat treatment will sometimes accomplish this. This process is a reversal of dissociation; that is, oxygen is absorbed by the material, and the oxidation states of the cations are increased. The rate of this absorption is controlled by the porosity and temperature of the material, and by the ambient atmosphere. These heat treatments are made at temperatures of about 350° C. to 950° C., i.e., below the normal temperature of crystallization. For the nickel-zinc ferrite of the example, satisfactory results may be obtained by turning the furnace off after the required heating at 1200° C., and allowing the material to cool to room temperature in air. Slightly better ferromagnetic properties may be obtained if an atmosphere of oxygen is used and the cooling rate experimentally determined for the optimum property desired. In some cases, it is desirable to have a definite ratio of cations of different oxidation states, which have been formed during high-temperature crystallization, remain in the finished material. This condition may be attained by quenching (rapid cooling), or by making the final material non-porous. In the latter case, absorption of oxygen is minimized during cooling of the material. Table II shows the effect of crystallization temperature for one hour on the properties of the example at 4.5 mc.

Table II

| Temperature | $\mu$ | Q | $\mu_0 \times Q$ |
|---|---|---|---|
| 1,025° | 35.4 | 142.8 | 5,055 |
| 1,050° | 39.0 | 191.6 | 7,471 |
| 1,075° | 42.7 | 209.3 | 8,926 |
| 1,100° | 47.2 | 210.4 | 9,930 |
| 1,125° | 51.6 | 207.7 | 10,717 |
| 1,150° | 59.5 | 195.5 | 11,638 |
| 1,175° | 65.2 | 188.3 | 12,268 |
| 1,200° | 72.6 | 171.6 | 12,500 |
| 1,250° | 80 | 143 | 11,400 |

Some typical ferrite body compositions and their electrical characteristics are shown in Tables III and IV.

Table III
[Composition in mol percent]

| Material | No. 1 | No. 2 | No. 3 | No. 4 | No. 5 |
|---|---|---|---|---|---|
| $Fe_2O_3$ | 50.0 | 50.0 | 50.0 | 50.0 | 50.0 |
| NiO | 32.8 | 32.8 | 32.8 | 22.8 | 32.8 |
| ZnO | 17.2 | 17.2 | 17.2 | 27.2 | 17.2 |
| $Co_2O_3$ | | 0.5 | 0.5 | 0.5 | |
| $MoO_3$ | | | 0.5 | 0.5 | 0.5 |

The compositions of Table III were wet ground for one hour in a Szegvari attritor at 120 r.p.m. The materials are then dried and micropulverized. The pulverized material is mixed with 3% by weight of a diethylene glycol ester of rosin (Flexalyn) and the material, which passes through a +80 mesh screen but retained on a +200 mesh screen, is pressed on a steel die. The pressed pieces are fired on a refractory slab at 1100 to 1200° C. The fired units are toroidal with an O.D. of 0.200 inch, I.D. of 0.125 inch and height of 0.050 inch. The units are then measured on a General Radio R.F. Bridge 916–AL, and Boonton "Q" meters 190A and 260A. Corrections were then made for copper losses.

Table IV

| Comp. No. | Freq., kc. | $\mu_0$ | Q | $\mu Q$ | Freq., mc. | $\mu_0$ | Q | $\mu Q$ | Freq., mc. | $\mu_0$ | Q | $\mu Q$ |
|---|---|---|---|---|---|---|---|---|---|---|---|---|
| 1 | 600 | 64 | 140 | 8,960 | 3 | 61 | 65 | 3,900 | 11 | 67 | 46 | 3,080 |
| 2 | 600 | 33 | 165 | 5,450 | 3.7 | 33 | 137 | 4,520 | 11 | 34 | 144 | 4,896 |
| 3 | 600 | 60 | 264 | 15,800 | 11 | 65 | 182 | 11,830 | 25 | 69 | 151 | 10,420 |
| 4 | 600 | 175 | 250 | 43,700 | 3.7 | 179 | 112 | 20,000 | | | | |
| 5 | 600 | 118 | 230 | 27,140 | 3 | 122 | 71 | 8,660 | 11 | 145 | 14 | 2,030 |

What is claimed is:

1. A method for preparing a magnetic body of sintered nickel-zinc ferrite crystallites having a $\mu Q$ product greater than 10,000 at about 600 kc. comprising mixing a batch of raw materials in the desired proportions to produce a ferrite upon heating, said batch consisting essentially of about 50 mol percent ferric oxide, about 22 to 33 mol percent nickel oxide, and about 17 to 28 mol percent zinc oxide, the proportions of ferric oxide, nickel oxide, and zinc oxide totaling about 100 mol percent, said batch containing in addition between 0.001 and 2.0 mol percent molybdenum as a compound thereof, forming a portion of said mixture to a desired shape, and then heating said shape in an oxygen atmosphere at temperatures between 950° C. and 1450° C. to react said raw materials to produce crystallites of said nickel-zinc ferrite and to sinter said crystallites into a coherent body.

2. A method for preparing a magnetic body having a $\mu Q$ product greater than 10,000 at about 600 kc. and consisting essentially of sintered nickel-zinc ferrite crystallites comprising mixing a batch of raw material in proportions to yield a nickel-zinc ferrite upon heating, said batch consisting essentially of about 50 mol percent ferric oxide, about 22 to 33 mol percent nickel oxide, and about 17 to 28 mol percent zinc oxide, the proportions of ferric oxide, nickel oxide and zinc oxide totaling about 100 mol percent, said batch containing in addition between 0.001 and 2.0 mol percent of molybdenum as a compound thereof, and up to 2 mol percent of at least one element of the group consisting of barium, cobalt, and vanadium, as compounds thereof, forming a portion of said mixture to a desired shape, and then heating said shaped mixture in an oxygen atmosphere at temperatures between 950° C. and 1450° C. to react said raw materials to produce crystallites of said ferrite and to sinter said crystallites into a coherent body.

3. A method for preparing a magnetic body having a $\mu Q$ product greater than 10,000 at about 600 kc. and consisting essentially of sintered nickel-zinc ferrite crystallites comprising mixing a batch of raw material in proportions to yield a nickel-zinc ferrite upon heating, said batch consisting essentially of about 50 mol percent ferric oxide, about 22 to 33 mol percent nickel oxide, and about 17 to 28 mol percent zinc oxide, the proportions of ferric oxide, nickel oxide, and zinc oxide totaling about 100 mol percent, said batch containing in addition between 0.001 and 2.0 mol percent molybdenum as an oxide thereof, forming a portion of said mixture to a desired shape, and then heating the shaped mixture in an oxygen atmosphere at temperatures between 950° C. and 1450° C. to react said raw materials to produce crystallites of said ferrite and to sinter said crystallites into a coherent body.

References Cited in the file of this patent

UNITED STATES PATENTS

| 2,656,319 | Berge | Oct. 20, 1953 |
| 2,723,239 | Harvey | Nov. 8, 1955 |
| 2,736,708 | Crowley et al. | Feb. 28, 1956 |

FOREIGN PATENTS

| 735,375 | Great Britain | Aug. 17, 1955 |
| 737,284 | Great Britain | Sept. 21, 1955 |
| 524,097 | Belgium | Nov. 20, 1953 |

OTHER REFERENCES

Mellor's Modern Inorganic Chemistry, pub. by Longmans, Green and Co., 1939, p. 779.